Oct. 4, 1966     H. BLASZKOWSKI     3,277,266
APPARATUS FOR HARD COATING METAL SURFACES
Filed Nov. 19, 1964
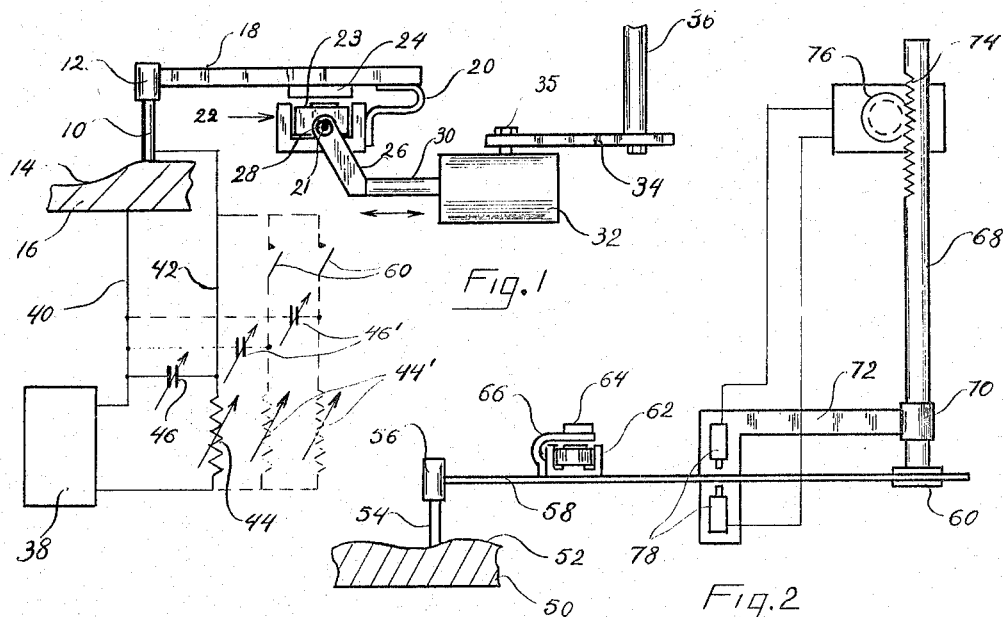
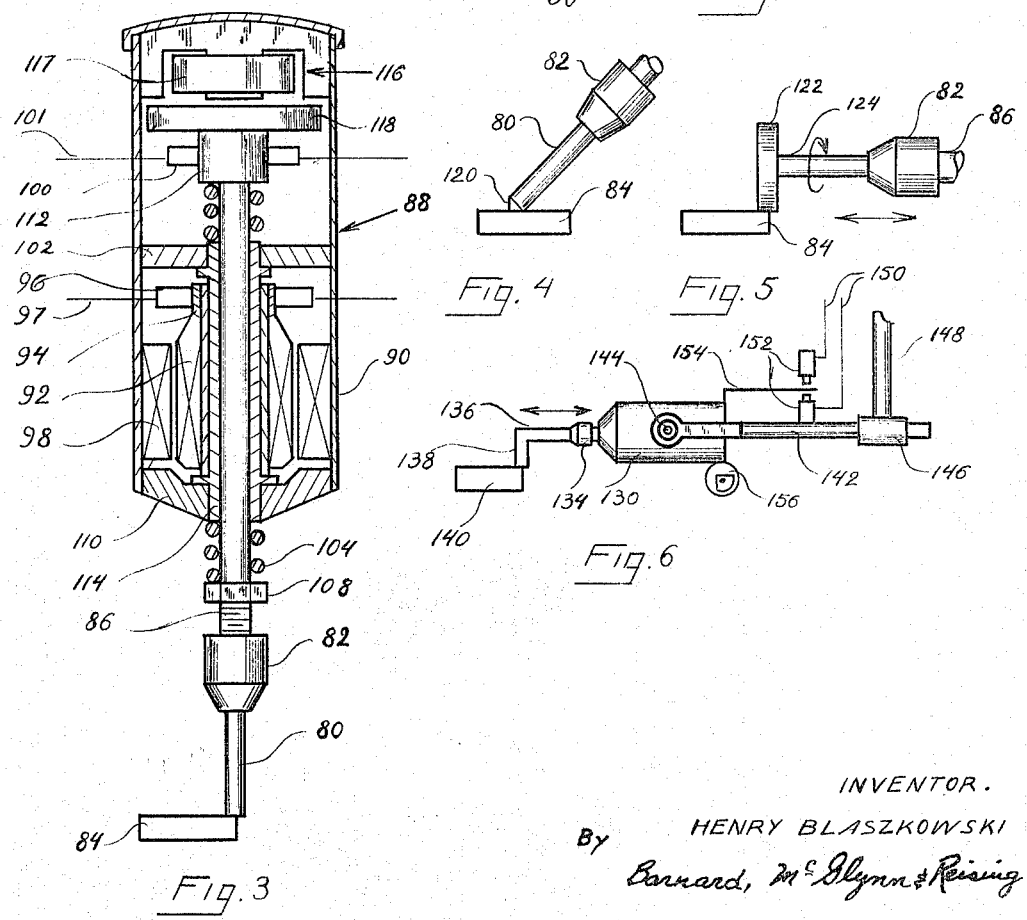
INVENTOR.
HENRY BLASZKOWSKI
By Barnard, McGlynn & Reising
ATTORNEYS

United States Patent Office 3,277,266
Patented Oct. 4, 1966

3,277,266
APPARATUS FOR HARD COATING METAL SURFACES
Henry Blaszkowski, 7312 Bingham, Dearborn, Mich.
Filed Nov. 19, 1964, Ser. No. 412,407
15 Claims. (Cl. 219—76)

This invention relates to apparatus for treating a metal surface through localized intense heating by means of passage or discharge of electric current between an electrode and the surface, either for affecting the physical properties of the surface or to form a layer of hard carbide on the surface. More particularly, the present invention relates to apparatus for supporting the electrode in such manner that it accurately moves over the surface being treated, following the contours thereof and with controlled contact pressure between the electrode and the surface.

This is a continuation-in-part of my U.S. patent application Serial No. 195,918 filed May 18, 1962 which in turn was a continuation-in-part of my U.S. patent applications, Serial No. 853,883 filed November 18, 1959; and Serial No. 822,767 filed June 25, 1959 all now abandoned.

It is well known that a metal surface can be coated by vibrating an electrode made of carbide, metal or other fusible material into and out of contact with the surface while maintaining the electrode and workpiece in an electrical circuit suitable for causing electrical discharges at each contact of the electrode with the workpiece. The electrical discharges create sufficient localized heat to cause the contacting tip of the electrode and the surface contacted by the electrode to fuse such that the carbide material of the electrode is transferred into firmly bonded relationship with the surface. That is, upon separation of the electrode from the surface with each vibration, minute amounts of the electrode material remain fused to the workpiece surface.

In my aforesaid patent applications and in my copending patent applications Serial No. 238,314 filed October 23, 1962; Serial No. 367,628 filed May 15, 1964; Serial No. 378,321 filed June 26, 1964; and Serial No. 381,671 filed July 10, 1964, there are disclosed various methods for surfacing metal workpieces wherein the electrode instead of or in addition to being vibrated into contact with the surface is either rotated or slid over and in contact with the surface while the electrical discharges occur to cause the formation of the hard carbide coating or other surface characteristics desired. As is also disclosed in my aforesaid patent applications, the electrode may, if desired, be made of a non-fusible material whereby the hardness imparted to the surface instead of being by way of the formation of a carbide thereon is by way of metallurgical hardening of the metal surface through the intense heat generated by the electrical discharges. Alternatively, the electrode can be made of carbon, or carbon can be applied to the surface prior to or during electrode contact with the surface, whereby the intense heat generated by the electrical discharges causes a reaction of the carbon with the metal of the surface to form a hard metal carbide in situ on the surface. As a still further alternative, the electrode can be made of a non-fusible material and a fusible hard carbide applied to the surface either prior to or during electrode contact whereby the hard carbide material is fused by the intense heat of the electrical discharges and bonded or defused into the metal surface being treated.

Irrespective of the precise method used, one of the serious problems involved is that of attaining a relatively uniform surface treatment over the entire workpiece area desired to be treated. For example, where hard carbide is deposited on the surface by the practice of the methods described, unless extreme care is taken by way of a manual operation by a highly skilled workman, the deposit tends to be of non-uniform thickness with undesirably jagged and rough spots and often with areas of the base surface left entirely bare. The problem is particularly acute where the surface being treated is non-planar and of varying contour.

It is a principal object of the present invention to provide a solution to the aforesaid problem. More specifically, the present invention has as one of its main objects, the provision of apparatus wherein a uniform high quality surface treatment can be accomplished by electrical discharges between an electrode and the surface being treated, irrespective of the precise contour of the surface. Still another object of the invention is the provision of improved apparatus for accomplishing a combined rotary and vibrating tool motion for the treatment of surfaces.

Briefly these objects are accomplished in accordance with the invention by apparatus wherein the electrode is caused to traverse the workpiece surface, by movement of the workpiece or the electrode or both, while simultaneously causing light contact between the electrode and the workpiece surface during such traversing movement and applying electrical energy to cause an electrical discharge between the electrode and the surface and thereby create intense localized heat by way of such contact, the mean contact pressure of the electrode against the surface being maintained relatively constant from point-of-contact to point-of-contact during the traversing movement irrespective of the contour of the workpiece surface. The contact between the electrode and workpiece can be periodic, as in the case of a vibratory motion perpendicular to the workpiece surface, or it can be continuous as where the electrode slides or is rotated as it traverses the surface. Further in accordance with the invention the apparatus comprises an electrode mounted on a movable member the precise position of which determines the mean contact pressure between the electrode and the workpiece surface, and the position of the movable member being controlled in accordance with the contour of the workpiece surface to thereby control the mean contact pressure.

More specifically, the preferred apparatus comprises an electrode adapted to contact the workpiece surface and secured to one end of an arm which extends at an angle to the perpendicular to the workpiece surface in the region of its contact with the electrode, means for causing the electrode to traverse or, in other words, undergo translatory movement with respect to the workpiece surface to be treated and means responsive to changes in contour of the workpiece surface for moving the end of the arm in a direction generally perpendicular to the surface of the workpiece. By so controlling the movement of the arm a uniform mean contact pressure can be maintained between the electrode and the surface as the electrode traverses the surface thereby providing a highly improved surface treatment. The apparatus is especially useful where the surface being treated is of non-uniform contour as for example a concave or convex surface having non-uniform radius of curvature or a surface having both concave and convex portions.

Other objects, advantages, and features of the invention will be apparent from the following detailed description of preferred embodiments thereof made with reference to the accompanying drawings in which:

FIGURE 1 is a side view showing vibratory apparatus for producing vibratory motion and linear traversing motion of the electrode in the direction parallel to the workpiece surface with means for causing it to follow the surface of an irregularly-shaped workpiece;

FIGURE 2 is another embodiment of my invention disclosing a modified vibratory apparatus;

FIGURE 3 is an elevational cross-sectional view through the motor of another embodiment of the invention wherein the electrode is rotated and is vibrated at an angle to the surface to be coated;

FIGURE 4 is a detail view showing the manner in which the apparatus of FIGURE 3 may be used to coat a workpiece surface;

FIGURE 5 is another detail side view disclosing how the apparatus of FIGURE 3 may be employed with a disc electrode to rotate the electrode about an axis parallel to the workpiece surface and simultaneously cause it to vibrate in a direction parallel to the surface of the workpiece; and FIGURE 6 is a side view of another embodiment of the invention disclosing apparatus for simultaneously vibrating the electrode both parallel and perpendicularly to the workpiece surface.

Referring now to the drawings in detail, FIGURE 1 discloses a vibratory apparatus including an electrode 10 disposed in an electrical circuit containing a capacitor for causing electrical discharges between the electrode and the surface 14. The electrode 10, which in this embodiment is in the form of a rod, is secured to a member, i.e. a bracket 12, and is positioned to contact the surface 14 of the workpiece 16. The bracket 12 is mounted at the end of a generally horizontal arm 18. The opposite end of the arm 18 is mounted on a bent spring 20 which is supported with respect to an electro-magnet 22. An armature 24 is fixed to the lower face of the arm 18 so as to be attracted by the electro-magnet 22 when current is supplied to the coil 23 thereby causing the arm 18 to move downwardly towards the electro-magnet 22 against the pressure of the spring 20, the spring 20 causing the arm to move upwardly when the current to the coil 23 discontinues. Hence, vertical vibratory reciprocating motion is imparted to the electrode.

The electro-magnet 22 is pivotally mounted on a bracket 26 by means of a pin 21. A coil spring 28 is wound about the pin on the bracket 26 and biases the arm 18 and electrode 10 in the direction of the workpiece surface 14. This produces a relatively constant mean contact pressure of the electrode 10 against the workpiece surface as the electrode traverses the surface to contact successive portions thereof as will now be described. The electrode thereby closely follows the changing contours of the workpiece surface.

The bracket 26 is secured to the shaft 30 of a variable stroke and speed linear actuator 32. The actuator 32 is thus adapted to impart a reciprocating linear motion to the entire assembly, thereby causing the electrode 10 to reciprocate in the direction parallel to the surface 14 to provide the surface traversing motion. For example, the actuator can be such as to provide up to a 15 inch stroke at surface speeds of from 1 to 50 inches per second. The actuator 32 is secured to another bracket 34 by means of screw 35 which permits the actuator to be adjustably positioned in the horizontal plane. The bracket 34 is connected to a vertical post 36 which may be connected to a suitable support, or a servo system of the type described in detail with respect to FIGURE 2.

From the above it will be seen that the electro-magnet 22 provides vibration of the arm 18 and electrode 10, thereby producing a reciprocating motion of the electrode 10 in the direction perpendicular to the workpiece surface 14 while the linear actuator 32 provides a second reciprocating motion of the electrode 10 in the direction parallel to the workpiece surface 14. Simultaneously, the electrode can also be moved so that it traverses the workpiece in a direction perpendicular to that of the linear motion imparted by the actuator 32, this by movement of the workpiece or by movement of the electrode-support arm-actuator assembly. Hence, the electrode traverses the workpiece surface back and forth thereacross and from one end to the other thereof such that the entire surface is treated. If desired, the apparatus of FIGURE 1 may be used without the linear actuator such that only vibratory motion in the direction perpendicular to the workpiece surface is obtained. In this case, the workpiece surface traversing motion can be accomplished entirely by movement of the workpiece though such is generally not desirable, particularly where the workpiece is large and heavy.

The most desirable speed for the parallel reciprocating surface traversing motion, induced by the actuator 32 in FIGURE 1, will depend upon a number of factors including current density, electrode size, and vibration frequency and amplitude. This motion produces a wiping effect of the electrode with respect to the workpiece during and after discharge which results in a smoother surface coating on the workpiece. In addition, this surface traversing motion prevents consecutive discharges in the same area, thereby accelerating the quenching of the workpiece surface and avoiding annealing. The motion is also useful for preventing the formation of a shoulder on the electrode where the edge of the workpiece is coated. As alluded to above, it will be understood of course that the traversing motion can be accomplished either by moving the electrode with respect to the workpiece, by moving the workpiece with respect to the electrode, or by moving both. Hence, where reference is herein made to the surface traversing motion of the electrode, such is intended to comprehend any and all motions of the workpiece, the electrode or both whereby there is accomplished relative translatory movement of the electrode over and with respect to the workpiece surface being treated. Further as indicated above, in practice it will usually be found most convenient to accomplish the traversing motion at least in part by movement of the electrode.

It will be further understood that where vibrating motion is desired between the electrode and workpiece, to bring the electrode rapidly into and out of contact with the surface being treated, such can be accomplished, if desired, by vibration of the workpiece rather than of the electrode. Hence, where reference is herein made to vibrating the electrode, such is intended to comprehend vibrating the electrode itself, the workpiece or both. It will be manifest that in most cases, where the workpiece is of considerable mass, it is most efficient and expedient to vibrate just the electrode.

A source of electric potential 38 is connected through electrical lines 40 and 42 to a variable resistor 44 and a variable capacitor 46. Electrical line 42 connects the resistor 44 to the electrode 10, this connection being shown only schematically in FIGURE 1. The electrical line 40 connects the voltage source 38 to the workpiece 16.

If desired the circuit can include additional capacitors 46 arranged, as indicated in dotted lines in FIGURE 1, with a plurality of variable resistors 44 and connected to the electrode and workpiece through a series of switches 60 which are asynchronously closed so as to allow the capacitors to instantaneously charge and discharge at desired intervals when the electrode is in contact with the workpiece surface thereby providing short duration pulses of electrical energy.

Although the electrical circuit shown in FIGURE 1 is of the capacitor type, as is generally preferred, it is to be understood that in this and in other embodiments of the invention other types of electrical circuits may be used for providing the electrical energy to create the passage of electric current between the contacting electrode and the workpiece surface to generate the intense localized heat. For example, circuits providing continuous, pulsating or interrupted A.C. or D.C. current may be used, the only requirement being that the current supply be such that it provides instantaneous intense localized electrical heating at the points of contact between the electrode and the surface without so overheating the electrode or a substantial area of the workpiece surface as to result in complete welding of the electrode to the surface with a resultant dead short. It will be manifest that in deciding which precise current source is most desirable for a given application, the size and therefore electrical resistance of the electrode, the traversing speed of the electrode, the materials of the electrode and the workpiece and similar factors should be taken into account. For example, if a continuous current were used of sufficient voltage and amperage to create a continuous arc between the vibrating electrode and the surface as the electrode approached and withdrew from the surface, such would result in an excessive electrode temperature particularly if the electrode were of relatively small mass and without means, such as a circulatory water system therethrough, to remove the excessive heat generated. Particularly where the motion of the electrode is vibrating, into and out of contact with the workpiece as it traverses same, a capacitor or other circuit which supplies current only as each contact is made is much preferred since it best assures the desired intense localized instantaneous heating at each point of contact with minimum possibility of undesirable electrode or workpiece over-heating.

The electro-magnet 22 is preferably energized with an alternating current of a low frequency such as 60–200 cycles per second. This causes the armature 24 to be alternately attracted and repelled from the electro-magnet core. The arm 18 is thus caused to vibrate in a generally vertical direction about the end of the bent spring 20. In an alternative configuration, the electro-magnet 22 may be energized from a direct current source through a breaker mechanism (not shown) which is operative when the armature 24 moves toward the electro-magnet 22, in the manner of an electric vibrator. In such embodiment the motion of the armature toward the electro-magnet core completes the circuit to the coil and the motion of the armature away from the core returning it to its normal position causes the electro-magnet to become re-energized.

In an alternative embodiment (not shown) the arm 18 itself may be flexible and the spring 20 replaced with a rigid connection. Actuation of the electro-magnet 22 would thus cause the arm 18 to flex and thereby produce the vibratory motion of the electrode 10 and the flexure of the arm would cause the contact pressure of the electrode with the workpiece to remain relatively uniform.

FIGURE 2 illustrates another embodiment of the invention wherein an electrode is supported so as to cause it to vibrate in a direction perpendicular to the surface being coated and to simultaneously follow the irregularities of that surface during its traversing motion. The workpiece 50 is a non-planar upper surface 52 which is to be coated by an electrode 54. The electrode is supported in a bracket member 56 at the end of a flexible arm 58. The opposite end of the arm is fixed in a bracket 60. An electro-magnet 62 is mounted midway along the arm 58; an armature 64 is fixed at the end of a spring 66 which normally maintains the armature 64 at a spacing relative to the magnet 62. A suitable current source (not shown) is adapted to energize the magnet 62 thereby causing the armature 64 to be attracted downwardly; repeated energization of the magnet 62 produces a reciprocating motion in the armature 64, which motion is transmitted in the form of vibration to the flexible arm 58. This causes the electrode 54 to be vibrated in the direction perpendicular to the surface 52 to the workpiece 50. Hence, the entire vibrator, the electrode and the electrode mounting means, here 56 and 58, all vibrate together. The weight of the electro-magnet 62 in cooperation with the flexible arm 58 provides the relatively constant pressure on the electrode causing it to follow the contours of the workpiece surface. The workpiece traversing motion of the electrode can be accomplished by movement of the workpiece with respect to the electrode, by movement of the apparatus as shown to cause the electrode to move over the workpiece, or both.

As noted above, the current source for the magnet 62 may be either direct or alternating current with a suitable breaker mechanism where necessary. The amplitude of the vibration may be adjusted by varying the position of the electro-magnet 62 on the arm 58, by changing the free length of the arm 58, or by varying the current supplied to the electro-magnet.

The bracket 60 is fixed to a vertical bar 68 which in turn carries a collar 70 mounted along an arm 72. The collar 70 and 72 may be adjustably positioned on the bar 68 to initially position the limit switches described below. The arm 72 may be moved vertically (generally perpendicularly to the surface 52 being coated) by motion of the bar 68. The opposite end of the bar 68 has a rack 74 formed on its surface and is in contact with the gear 76 which acts to cause the bar 68 to move up or down vertically as the gear turns in either a counterclockwise or a clockwise direction, respectively. The gear 76 is motorized and reversible and its energization and direction are controlled by a pair of limit switches 78 which are fixed on the arm 72 on opposite sides of the arm 58. When, during the workpiece traversing motion of the electrode, the workpiece surface 52 changes so as to cause the electrode 54 and the arm 58 to move in a general upward direction, the upper limit switch 78 is energized and causes the gear 76 to turn so as to raise the base 72 with respect to the workpiece 50 so that the electrode 54 is raised to the point where the arm 58 is generally horizontal. Similarly when, during such traversing motion, the surface of the workpiece lowers so as to move away from the electrode 54, the arm 58 acts to contact the lower limit switch 78 which energizes the gear 76 in such a direction as to lower the bar 68 and the base 72. The electrical circuitry associated with this action may be of any conventional variety and the servo may be described as the on-off type with a dead zone. The servo thus assures relatively uniform contact pressure of the electrode with the surface and causes the electrode to follow the workpiece surface regardless of variations in the surface elevation.

The limit switches 78 are preferably positioned such that the arm 58 will undergo considerable motion before one of the switches will be actuated. The position of these switches will substantially affect the amplitude of the vibratory motion of the arm 58. For example, if the arm is bent substantially upwards adjacent the electrode due to the elevation of the workpiece surface, and if the upper switch 78 is not actuated, the tension in the arm will dampen out the vibration that would normally be produced by the electro-magnet. Thus by adjusting the position of the limit switches 78, the amplitude of vibration may be varied as required.

Although the apparatus of FIGURE 2 employs an electro-magnet 62 to induce the vibratory motion of the electrode 54, it can be seen that various other known devices, e.g. a rotating offset weight assembly, can be used to achieve a similar result. The electrical current for the electrode of the FIGURE 2 embodiment as for all other embodiments can be the same as described above with reference to FIGURE 1.

The apparatus shown in FIGURE 2 is preferred over that shown in FIGURE 1, particularly for the treatment of workpiece surfaces which have rather substantial changes in contour. That is, in the FIGURE 2 embodiment the flexible arm 58 provides relatively uniform contact pressure between the electrode and the surface, and if the change in surface contour is such as to cause flexure of the arm to such extent that the contact pressure would normally be changed to any significant extent, the entire arm is caused to move just sufficiently to immediately re-establish the desired light contact pressure. It will be understood of course that if desired the arm 58 can be of non-flexible construction but secured by means of a spring to enable it to pivot in a vertical plane against the spring pressure as for example in FIGURE 1.

For many applications, a simple vibratory motion of the electrode in a direction generally perpendicular to the surface of the workpiece, as the electrode traverses the surface, is sufficient to produce the desired coating. Such motion is provided in the embodiments shown in FIGURES 1 and 2. However, it is generally desirable that other types of motion be employed as specified in my aforesaid applications.

FIGURE 3 shows the motor of an embodiment of the present invention which is adapted to simultaneously vibrate and rotate the electrode. This combination of vibratory and rotary motion has been found to provide particularly advantageous results in that it creates an excellent finish of the coating material on the workpiece surface. An electrode 80 is supported and held in a chuck 82 above a workpiece 84 and is connected to a central shaft 86. The shaft 86 is central to a motor vibrator unit generally indicated at 88. The unit is disposed in an insulating housing 90.

The motor is preferably of the conventional type. A rotor 92 is wound and fixed to the shaft 86 while a commutator 94 provides power to the rotor in connection with a set of brushes 96 which receive electrical current through leads 97. A wound stator 98 completes the motor arrangement. The shaft 86 electrically connects the electrode 80 and a pair of brushes 100 which receive current through leads 101 and are disposed within the housing above a cross plate 102. A pair of springs 104 and 106 are disposed respectively between a nut 108 on the shaft 86 and the end bell 110, the cross plate 102 and the slip ring assembly 112. These springs 104 and 106 allow the shaft 86 to undergo an axial movement within a sleeve 114 which is fixed with respect to the rotor of the motor. The nut 108 may be rotated to adjust the tension on the springs. A spline connection retains the shaft 86 in rotatable alignment with the sleeve 114. The sleeve 114 is journaled in the cross plate 102 and the end bell 110.

An axial vibration is induced in the shaft 86 by an electro-magnet 116. The vibrating frequency is preferably in the range of 60–400 c.p.s. The electro-magnet's coil 117 is connected to an alternating current source or to a breaker or pulse generator device. It acts to attract an armature 118 which is fixed to the upper end of the slip ring assembly 112. The device 88 therefore produces a combined rotation of the electrode 80 about its longitudinal axis and a vibration in the direction of its longitudinal axis. The FIGURE 3 device can be used in place of the electrode 10 in FIGURE 1 or the electrode 54 in FIGURE 2, thereby eliminating the need for the vibrating mechanisms shown in these FIGURES 1 and 2.

FIGURE 4 shows an embodiment wherein the assembly of FIGURE 3 is used for treating a workpiece, here designated as 84. The entire assembly is held, as by the support apparatus shown in FIGURE 1, such that the electrode 80 extends at an angle to the plane of the workpiece 84. The contacting tip of the electrode 80 is, in this embodiment, bevelled as indicated at 120 in order to make contact over a substantial area; otherwise it tends to wear itself into this shape. In order to limit this contacting area, the electrode 80 may be provided with a longitudinal concentric axial bore (not shown). In some cases, it may be desirable to provide the coating material in the form of powder and to force this powder material through such longitudinal bore in the electrode 80. Similarly, an inert or reducing gas may be passed through the interior of the electrode where, for example, such gas is needed to protect the coating being formed against oxidation. These various modifications are described in greater detail in my aforesaid copending patent applications.

In FIGURE 5 a cylindrical or disc-type electrode 122 is provided at the end of a shaft 124 mounted in the chunk 82 which is actuated by the motorized assembly 88 of FIGURE 3. The shaft 124 extends parallel to the surface of the workpiece 84 with the electrode 122 contacting the surface of the workpiece 84 tangentially. The motorized unit 88 of FIGURE 3 produces an axial reciprocating motion in the shaft 124 and electrode 122 and also rotates the electrode 122 about the axis of the shaft 124. As shown in FIGURE 5, the electrode 122 is disposed on one edge of the workpiece 84 so that a portion of the surface of the electrode 122 contacts the surface of the workpiece and a portion overhang the edge thereof. This allows the edge of the workpiece to be coated without producing a shoulder on the electrode as would occur if only a rotational motion were employed, and permits the workpiece surface to be uniformly coated to the very edge. Hence, with this embodiment there can be vibrating or reciprocatory workpiece traversing motion in one direction, non-vibrating workpiece traversing motion in another direction; i.e. parallel to the edge, along with rotary motion of the electrode. It will be seen that by incorporating FIGURE 5 device into, say, the FIGURE 2 apparatus as an extension of the arm 58 and in place of the electrode 54, there can be added to the aforesaid motions a vibrating motion perpendicular to the workpiece surface such that the electrode 122 rapidly moves into and out of contact with the surface, this by way of the vibrator of FIGURE 2. To assure a minimum contacting area between the electrode and the workpiece surface, thereby providing an effective coating even under higher electrode pressure, it may be desirable to reduce the thickness of the disc electrode 122 to a very small dimension.

FIGURE 6 represents another embodiment of the invention wherein an adjustable electrode reciprocating unit 130 supports an electrode in a chuck 134. The electrode has a first section 136 which extends parallel to the axis of the unit 130 and is fixed within the chuck 134. It also has an extension 138 which depends perpendicularly from the end of the section 136 and acts to contact the surface of a workpiece 140 which is to be coated. The section 136 is normally disposed parallel to the surface of the workpiece 140. The unit is suspended on an arm 142 and coiled spring 144 acts to bias the electrode 132 against the work surface and provide relatively uniform contact pressure. The arm 142 is adjustably mounted in a bracket 146 so that the displacement of the drive unit 130 from the bracket may be adjusted.

The position of the bracket 146 and the drive unit 130 in the direction generally perpendicular to the surface of the workpiece 140 is controlled by an arm 148 which is movably supported within a gear and rack assembly (not shown) of the type shown in FIGURE 2. The motion of the gear and rack assembly and hence of the arm 148 is controlled by a servo system which includes the lines 150 which connect the unit to a pair of limit switches 152. The limit switches sense the position of a projection 154 which is fixed to the drive unit 130. As the workpiece surface varies as it is moved beneath the electrode 132, it may cause the drive unit to pivot in either direction about the arm 142. When this movement reaches a critical point, i.e. at a point where the electrode contact pressure is significantly changed, it actuates one of the limit switches 152 and causes the gear and rack assembly to move the arm 148 in such a direction as to correct for the motion. If desired, an eccentric motorized weight such as is indicated at 156 may be attached to the drive unit 130 so as to provide it with a vibratory motion in a direction perpendicular to the surface of the workpiece 140. Thus the contacting area of the extension 138 on electrode 132 is moved with respect to the surface of the workpiece 140 both in the direction parallel to the surface of the workpiece and in the direction perpendicular thereto. As discussed above with respect to FIGURE 5, the parallel or axial motion of the electrode 132 is particularly important for coating the edges of the workpiece surface and preventing the formation of a shoulder on the contacting area of the electrode.

It can be seen that the motorized assembly 88 of FIGURE 3 may be used with a servo system of the type shown in FIGURE 2 and FIGURE 6 if desired. In addition the FIGURE 3 device has applications other than for hard surfacing. For example, it can be used as a compact hand held or machine mounted polishing or grinding tool in which the tool is caused to simultaneously rotate and axially vibrate while contacting the workpiece surface. This is highly desirable for many polishing and grinding operations. Other applications for this assembly will be readily obvious to one skilled in the art to which this invention pertains.

Whereas in the embodiments shown, the workpiece surface is generally planar, it will be understood that it can be of other shapes, for example a shaft or other cylindrical workpiece which is rotated while being treated to provide the surface traversing motion between the electrode and the surface.

Hence, it will be apparent to those skilled in the art to which this invention pertains that specific features described with reference to one embodiment may be used in other embodiments and that various changes and modifications may be made without departing from the spirit of the invention and the scope of the claims which follow.

I claim:

1. Apparatus for treating a surface comprising an electrode secured to one end of an arm for contact with said surface, the end of said arm being movable in a plane generally perpendicular to said surface, means for causing said electrode to traverse said surface, means on said arm responsive to the contour of said surface for positioning the end of said arm in said plane to control the mean contact pressure between said electrode and said surface as said electrode traverses said surface and means for causing electrical contact discharges between said electrode and said surface during contact therebetween to generate localized heating of the contacted portions of said surface, said second mentioned means including electrical switch means actuatable by movement of said arm in said plane and connected to means for moving said arm in said plane upon actuation of said switch means.

2. Apparatus for treating a surface by contacting said surface with an electrode and passing electric current between said electrode and said surface during contact therebetween to cause intense localized heating of said surface, said apparatus comprising an electrode support arm, said electrode being mounted on said arm for contact with said surface, said arm extending at an angle to a line perpendicular to said surface in the region thereof in contact with said electrode and said arm being movable in a plane generally perpendicular to said surface in said region of contact, means for imparting a surface traversing motion to said electrode, means for sensing the position of said arm in said plane and the means actuated by said sensing means for changing the position of said arm in said plane to thereby maintain a relatively uniform mean contact pressure between said electrode and said surface during the surface traversing motion of said electrode.

3. An apparatus for continually making and breaking electrical contact between an electrode and a workpiece comprising: an electrode-supporting arm, said electrode being mounted on said arm; mounting means for said arm spaced apart from said electrode, the longitudinal axis of said arm being so oriented as to be at an angle to a line perpendicular to the workpiece surface in the region of contact with said electrode; means for imparting a reciprocating motion to said arm which motion possesses a substantial component perpendicular to said workpiece surface in the region of contact of said surface with said electrode so as to cause said electrode to repeatedly contact said surface; means for sensing the relative position of said arm with respect to said workpiece surface; and means for moving said arm mounting means in directions generally perpendicular to the surface of the workpiece under the control of said sensing means in such a manner as to maintain a relatively uniform mean contact pressure between said electrode and said surface.

4. The structure of claim 3, in which said means for sensing the magnitude of the reciprocating motion of the arm comprises a pair of switches disposed on opposite sides of said arm and being arranged so that one of them is actuated by the arm as a result of an excessive reciprocation in a particular direction.

5. An apparatus for continually making and breaking electrical contact between an electrode and a workpiece comprising: an electrode secured to an arm, mounting means for said arm spaced apart from said electrode, the longitudinal axis of said arm being so oriented as to extend at an angle to a line perpendicular to the workpiece surface in the region of contact with said electrode; means for imparting a reciprocating motion to said arm which motion possesses a substantial component perpendicular to said workpiece surface in the region of contact with said electrode so as to cause said electrode to repeatedly contact said surface; means for sensing the relative positional relationship between said arm and the workpiece surface being contacted by said electrode; and a servomechanism system controlled by said sensing means and operative to move the arm in such a direction as to maintain a relatively constant positional relationship between said arm and said workpiece surface.

6. Apparatus for supporting an electrode in contact with a workpiece surface comprising: an electrode supporting unit including an arm extending at an angle to a line perpendicular to said workpiece surface in the region of its contact with said electrode; means mounting said unit in such a manner as to bias the electrode to contact the workpiece; and a control system operative to sense the position which said arm assumes with respect to said surface and to move said arm in such a manner as to maintain a generally constant mean contact pressure between said electrode and said surface.

7. An apparatus for continually making and breaking electrical contact between an electrode and a workpiece comprising: an electrode supporting unit operative to rotate said electrode; an arm operative to support said unit; swivel mounting means for said arm, the longitudinal axis of said arm being at an angle to a line perpendicular to said workpiece surface in the region of its contact with the electrode; and actuating means for causing said arm to pivot about its mounting in a reciprocating manner so as to cause said electrode to be brought into and out of contact with said workpiece along a line having a substantial component perpendicular to the workpiece surface in the region of contact with the electrode.

8. An apparatus for continually making and breaking electrical contact between an electrode and a workpiece comprising: an electrode supporting unit operative to continually rotate said electrode and to reciprocate it in a direction generally parallel to the surface of the workpiece being contacted; an arm operative to support said unit; swivel mounting means for said arm, and means for causing said arm to pivot about its mounting in a reciprocating manner so as to cause said electrode to be brought into and out of contact with said workpiece along a line having a substantial component perpendicular to the workpiece surface in the region of contact with the electrode.

9. An apparatus for continually making and breaking electrical contact between an electrode and a workpiece comprising: an electrode supporting unit operative to continually recopricate said electrode in a direction generally parallel to the surface of the workpiece being contacted; an arm operative to support said unit; swivel mounting means for said arm, the longitudinal axis of said arm being at an angle to a line perpendicular to said workpiece surface in the region of its contact with the electrode; and actuating means for causing said arm to pivot about its mounting in a reciprocating manner so as to cause said electrode to be brought into and out of contact with said workpiece along the line having a substantial component perpendicular to the workpiece surface in the region of contact with the electrode.

10. An apparatus for continually making and breaking electrical contact between an electrode and a workpiece, comprising: an electrode-supporting arm, said electrode being mounted on said arm; mounting means for said arm spaced apart from said electrode, the longitudinal axis of said arm being at an angle to a line perpendicular to said workpiece surface in the region of its contact with said electrode, said arm being movable about said mounting means with a motion having a substantial component perpendicular to said workpiece surface in the region of its contact with said electrode; means adapted to cause said electrode to contact said surface with a relatively uniform mean contact pressure regardless of variations in the elevation of said workpiece surface at the region of its contact with said electrode; and actuating means adapted to impart a transverse reciprocating motion to said arm in said perpendicular direction so as to cause said electrode to continually make and break contact with said surface.

11. An apparatus for continually making and breaking electrical contact between an electrode and a workpiece, comprising: an electrode-supporting arm, said electrode being mounted on said arm, movable mounting means for said arm spaced apart from said electrode, the longitudinal axis of said arm being at an angle to a line perpendicular to said workpiece surface in the region of its contact with said electrode, said arm being movable about said mounting means with a motion having a substantial component perpendicular to said workpiece surface in the region of its contact with said electrode; means adapted to translate said mounting means and arm in the direction perpendicular to said workpiece so as to position said electrode adjacent said surface, spring means bearing on said arm and adapted to force said electrode in contact with said surface regardless of minor variations in the elevations of said workpiece surface in the region of its contact with said electrode; and actuating means adapted to repeatedly oppose said spring means and thereby break contact between said electrode and said surface.

12. An apparatus for continually making and breaking electrical contact between an electrode and a workpiece, comprising: a generally horizontal electrode-supporting arm, said electrode being mounted generally vertically on said arm; movable mounting means for said arm spaced apart from said electrode, means adapted to move said mounting means and arm in direction perpendicular to said workpiece surface so as to position said electrode adjacent said surface, said arm being pivotable about said mounting means under the influence of gravity to a position where said electrode contacts said workpiece surface regardless of variations in the elevation of said workpiece surface at the region of its contact with said electrode; and actuating means adapted to repeatedly oppose the gravitational force and thereby break contact between said electrode and said surface.

13. A device operative to simultaneously rotate an electrode about an axis and to cause it to vibratingly reciprocate along that axis comprising: a stator; a rotor disposed so as to be surrounded by said stator and having a central aperture therein; a central shaft passing through said aperture in said rotor; means connecting said shaft to said rotor so that said shaft rotates with said rotor, said means permitting axial movement of said shaft with respect to said rotor; an electrode; flexible coupling means retaining said electrode on said shaft and permitting axial movement with respect thereto; an armature fixed to the opposite end of said shaft; an electromagnet adjacent said armature; a source of varying current for said electromagnet operative to cause it to repeatedly attract said armature so as to cause said shaft to reciprocate along its axis; and slip rings connecting said electrode to said current source through said shaft.

14. A device operative to simultaneously rotate an electrode about an axis and to cause it to vibratingly reciprocate along that axis comprising: a stator; a rotor disposed so as to be surrounded by said stator and having a central aperture therein; a central shaft passing through said aperture in said rotor; means connecting said shaft to said rotor so that said shaft rotates with said rotor, said means permitting axial movement of said shaft with respect to said rotor; an electrode; flexible coupling means retaining said electrode on said shaft and permitting axial movement with respect thereto; an armature fixed to the opposite end of said shaft; and an electromagnet adjacent said armature; a source of varying current for said electromagnet operative to cause it to repeatedly attract said armature so as to cause said shaft to reciprocate along its axis; spring means for biasing said shaft into a central position with respect to said rotor; and slip rings connecting said electrode to said current source through said shaft.

15. Apparatus for treating a metal workpiece to provide a hard surface thereon comprising an electrode, a vibrator, mounting means for said electrode securing said electrode to said vibrator, and an electrical circuit for passing short duration pulses of electrical energy between said electrode and the surface of said workpiece upon contact therebetween to create intense localized heating of the portions of workpiece surface contacted to cause localized fusion thereof, said mounting means being secured to said electrode and transmitting vibration from said vibrator to said electrode such that the entire vibrator, electrode and mounting means all vibrate together.

References Cited by the Examiner

UNITED STATES PATENTS

| | | | |
|---|---|---|---|
| 416,873 | 12/1889 | Tilghman | 219—50 |
| 1,097,895 | 5/1914 | Thomson | 219—87 |
| 1,217,431 | 2/1917 | Foley | 219—60 |
| 1,298,590 | 3/1919 | Smith | 219—124 |
| 1,498,167 | 6/1924 | Hill | 219—124 |
| 1,784,015 | 12/1930 | Lane et al. | 219—77 |
| 1,791,968 | 2/1931 | Morgan | 219—77 |
| 2,095,295 | 10/1937 | Smith et al. | 219—83 X |
| 2,204,545 | 6/1940 | Faunce | 219—130 |
| 2,481,163 | 9/1949 | Setzler | 219—130 |
| 2,485,361 | 10/1949 | Condit et al. | 219—69 |
| 2,490,302 | 12/1949 | Holfelder | 219—69 |
| 2,813,192 | 11/1957 | Brooks et al. | 219—130 |
| 2,885,534 | 5/1959 | Ter Berg et al. | 219—123 |
| 2,908,801 | 10/1959 | Cresswell | 219—74 |
| 2,923,808 | 2/1960 | Wattles | 219—69 |
| 2,945,936 | 7/1960 | Carmin | 219—69 |
| 2,975,263 | 3/1961 | Green et al. | 218—83 |

FOREIGN PATENTS 624,592    6/1949   Great Britain.

JOSEPH V. TRUHE, *Primary Examiner.*